Oct. 27, 1936.  P. B. SCHUSTER  2,058,518
THICKNESS MEASURING INSTRUMENT
Filed Oct. 22, 1927   3 Sheets-Sheet 1
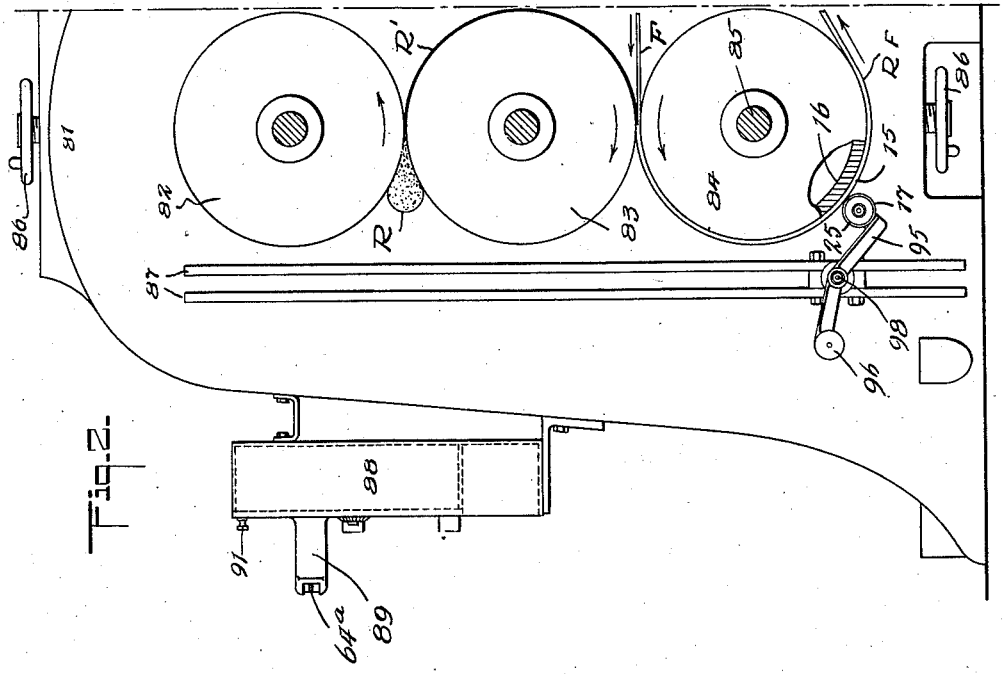

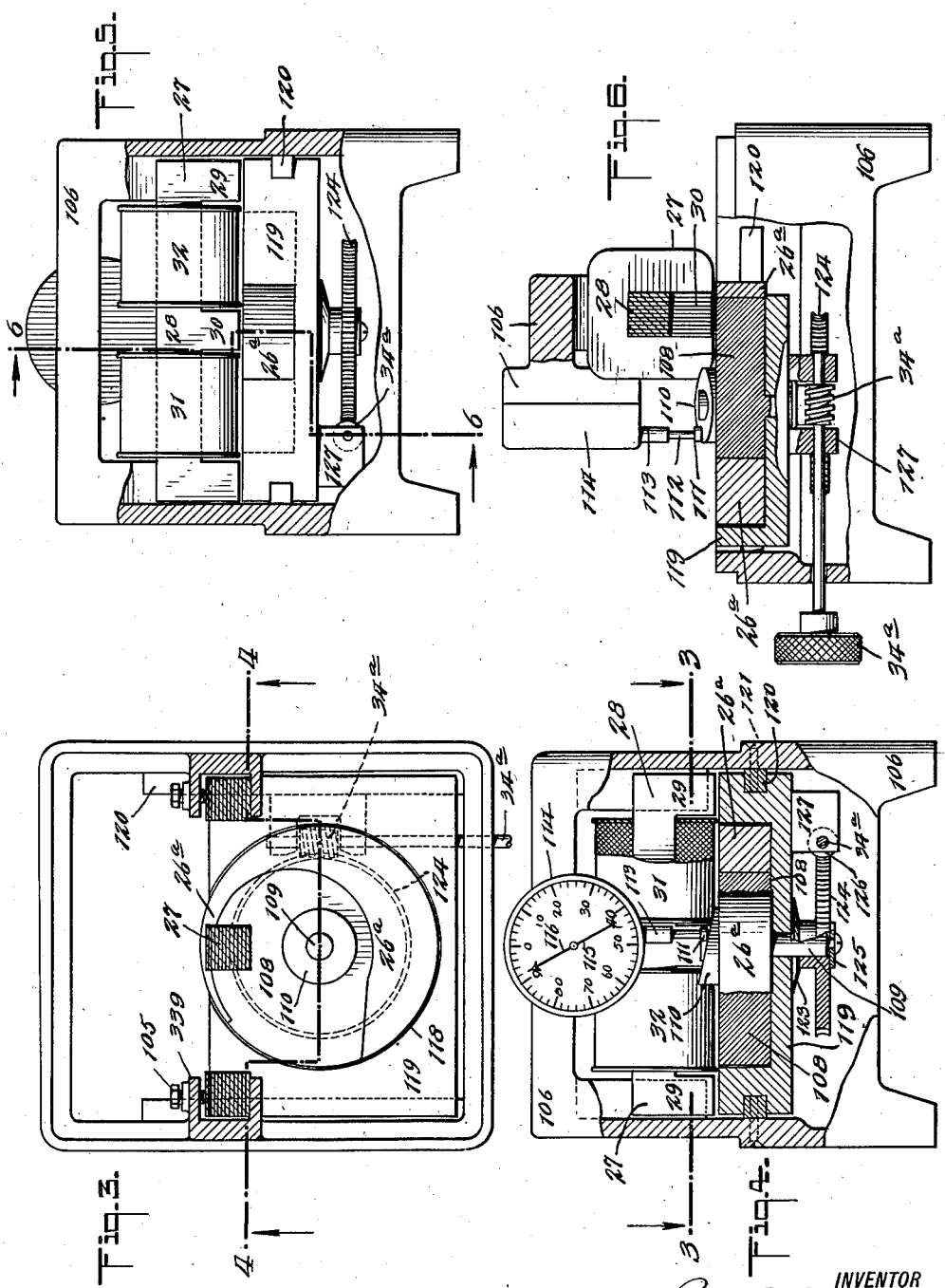

Oct. 27, 1936.　　　P. B. SCHUSTER　　　2,058,518
THICKNESS MEASURING INSTRUMENT
Filed Oct. 22, 1927　　　3 Sheets-Sheet 3
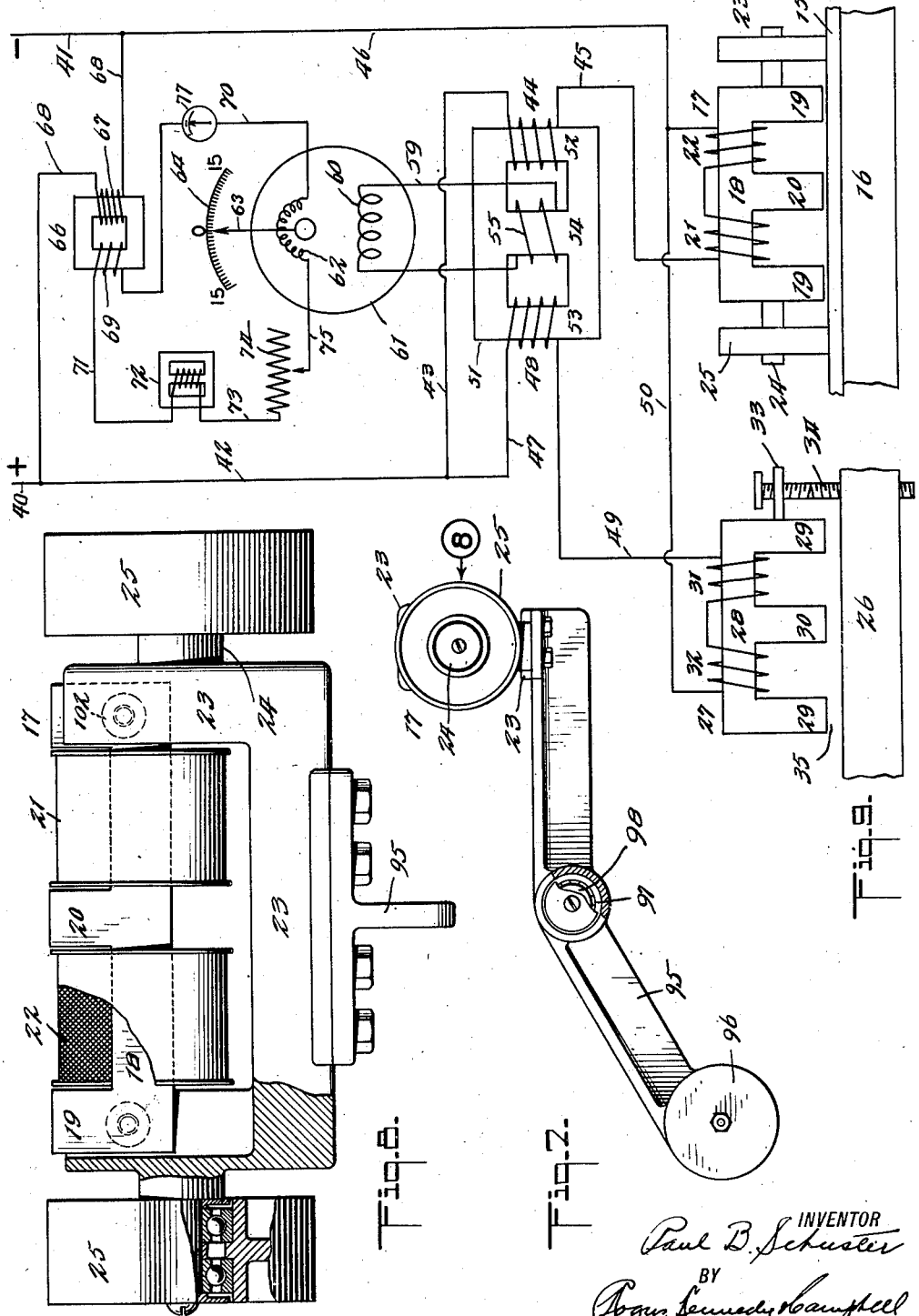
INVENTOR
Paul B. Schuster
BY
Rogers, Kennedy & Campbell
ATTORNEYS Patented Oct. 27, 1936

2,058,518

UNITED STATES PATENT OFFICE 2,058,518

THICKNESS MEASURING INSTRUMENT

Paul B. Schuster, Akron, Ohio, assignor to The Magnetic Gauge Company, Akron, Ohio, a corporation of Ohio Application October 22, 1927, Serial No. 228,045

4 Claims. (Cl. 177—351)

This invention is a novel thickness measuring instrument, that is to say an apparatus or gage for measuring, indicating or regulating the dimension or thickness of various materials or articles. The herein disclosed measuring instrument employs certain electromagnetic principles in determining or testing the dimension or thickness of sheet or other material located between the operative elements of the gage.

The present invention is of utility in many industrial fields where it is desired to measure, indicate or regulate the thickness (or other dimension) of a piece or layer of any non-magnetic material, such for example as rubber, fabric, rubberized fabric, paper or glass; also various non-magnetic metals, such as sheet aluminum or brass. The particular industrial use for which the disclosed measuring instrument has been devised and designed is the gaging or indicating of the thickness of a layer or web of rubber material, or rubberized fabric, during the production of the same in calendering apparatus, this invention being applied to the advancing material while in motion in a manner to operate progressively thereon for the purpose of detecting errors or variations from the desired or standard thickness of web or layer to be produced; thus ensuring superior uniformity of product, and effecting a large ultimate saving of raw material by reason of obviating the usual need of allowing an excess proportion of rubber in order to avoid the alternative of an insufficiency thereof and depleted thickness of product.

The general object of the present invention is to afford a thickness measuring instrument having the qualities and uses referred to and which possesses superior efficiency, uniformity and reliability of operation. A further object is to permit the detection, and therefore the immediate correction thereof by regulation, of minute differences or departures from the predetermined thickness of stock being produced. A further object is to afford such an apparatus which is simple in construction, convenient in operation, with a minimum of moving parts, and rugged and durable in use.

A particular object hereof is to provide for the gaging or indicating of the thickness of the web or other sheet material by electromagnetic means operated solely by the absolute distance or space of separation between the gaging parts produced by the presence of the layer or material being measured, and therefore independent of any vibrations or other irregular movements or changes in the gaging parts or mountings.

Other and further objects and advantages of the present invention will be pointed out in the hereinafter following description of an illustrative embodiment thereof or will be apparent to those conversant with the subject matter. To the attainment of such objects and advantages the present invention consists in the novel thickness measuring instrument or gage and the novel features of operation, combination, arrangement, construction and detail herein illustrated or described.

The disclosed embodiment of the invention may be described, in one aspect, as utilizing the principles of reactance as occurring in the coil of an electromagnet energized by alternating current, the magnet positioned at one side of the article or layer being tested or measured, and an iron armature at the other side, in opposition to the magnet, the degree of separation or space between them being thus determined solely by the thickness of the article, and this separation or distance in turn determining the magnetic flow through magnet and armature, and thereby the inductive reactance in the coil, so that by measuring the resulting impedance to flow, for example by a current meter or ammeter, there is afforded a delicate and satisfactory indication which varies in correspondence with variations in the thickness of the article being gaged. This may give a mere visual indication, by the ammeter reading, of errors in thickness, and the extent thereof, thus permitting manual adjustment or correction; or in some cases the described effects may be caused to work automatically a corrective adjustment, for example in the progressive production of a web or layer.

In the accompanying drawings Fig. 1 is a front elevation of a calender apparatus embodying the present invention, broken away to shorten the drawing.

Fig. 2 is a right elevation of the same, partly in vertical section and partly broken away to show interior structure.

Fig. 3 is a top plan view of the master or setting magnet and its accompanying mechanism and mounting, shown partly in section taken on the line 3—3 of Fig. 4.

Fig. 4 is a front elevation of the mechanism shown in Fig. 3, taken partly in section on the line 4—4 of Fig. 3.

Fig. 5 is a rear elevation of the elements shown in Figs. 3 and 4, with the enclosing plate partly broken away to show the interior.

Fig. 6 is a right elevation of the same elements taken partly in section on the line 6—6 of Fig. 5.

Fig. 7 is a detached right elevation view of the gaging or measuring magnet and its carrying parts, enlarged as compared with Fig. 2.

Fig. 8 is a rear elevation of the parts shown in Fig. 7, that is looking in the direction of the arrow 8 on Fig. 7.

Fig. 9 is a diagram illustrating in a simple form the principles of the present invention.

Referring first to the diagram Fig. 9, this indicates the material or layer 15 which is to be gaged, located between an armature 16 and an electromagnet 17, the armature for example being an underneath supporting block or sheet or roller of iron, and the magnet being of any desired structure and shape located above or at the opposite side of the material. A highly effective magnet consists of a laminated or built up core comprising a main section or body 18 with legs 19 at the two ends and a leg 20 at the middle, all having their terminal ends in opposition to the armature 16. The electric coils of the magnet may conveniently consist of insulated copper wire applied on the core body 18, and two such coils 21 and 22 are shown, wound in relatively opposite directions, and located between the middle leg 20 and the end legs 19 respectively, so that in effect the magnet may act as two simple horseshoe or U-shaped magnets which are in endwise alinement, and are preferably integral, and present substantially the shape of the letter E, with the outer legs 19 having the same polarity and the middle leg 20 the opposite polarity.

While the magnet 17 might in some cases rest directly in contact upon the rubberized fabric or other layer to be measured it is preferably held spaced slightly therefrom, for example as indicated, by means of a support 23 which may comprise an axle 24 carrying wheels or rollers 25 bearing on the material and of such diameter as to give the described relation and at the same time to permit relative movement as between the magnet and the material, either by rolling the support or carriage 23 over the material, or by drawing the material and its underlying support or roll 16 beneath the magnet, with rolling contact between the material and the wheels 25, which may be constructed of aluminum or other non-magnetic substance.

It will be understood that an alternating current is supplied to the coils 21 and 22 of the magnet 17 and that the reactance in these coils causes an impedance in or retarding of the current in an amount which may be measured by a current meter or ammeter. The lines of magnetic force created in the magnet core by the current flow extend across the space between the magnet and the armature and through the armature, which thus affords a substantially closed magnetic circuit. In the presence of such an armature the inductive reactance in the coils, and the resulting impedance, are greater than in the absence of the armature, and the closer the armature is brought to the magnet the stronger will be the magnetic flow and the greater the reactance in the coils and the impedance to the current. Therefore when variations occur in the dimension of the material 15 being measured the resulting adjustment of the magnet and armature relatively toward or from each other brings about variations in the magnetic flow and consequent variations in impedance in the alternating current circuit and in the amount of current which can flow. It is found that by reading the changes in current brought about by the relative approach or separation of the magnet and armature a very delicate indication is obtainable of the thickness of the material or layer being gaged and of variations thereof. As already stated no factor in the described combination is able to cause any change in the reactance other than variations in the thickness of the layer operating to lift or lower relatively the magnet 17; the interrelation of the parts of the magnet and its coils is fixed, and only changes in the absolute thickness of the material being gaged can change the distance of separation or affect the reading.

The particular type of magnet 17 herein disclosed, comprising a body carrying oppositely wound coils and with preferably more than two legs extending toward the armature, is of special advantage for the present purposes in increasing the delicacy and sensitiveness of operation. As compared with an ordinary horseshoe or U-shaped magnet with single coil the E-shaped magnet with reversely wound coils gives several times the extent of variation of impedance and current flow for a given variation of armature separation. This is because the two-coil three-leg magnet, when very close to the armature, operates largely like two independent U-magnets, affording therefore very high reactance; whereas when far removed from the armature, so that the magnetic flow is small, the oppositely wound coils 21 and 22 tend to oppose or neutralize each other, as they would if so wound on an ordinary U-magnet, so that the magnetic flow, and consequently the reactance, are very low. In a sense the effect of the variations in thickness of the material being gaged is multiplied by the described arrangement, wherefore the apparatus is extremely sensitive to minute variations in thickness.

Instead of relying on the gaging magnet 17 alone, and determining the thickness by measuring the current flowing in the coils 21 and 22 thereof, there is preferably employed a second electromagnet, which may be considered a master or standard magnet, the two magnets cooperating to afford a differential action. For example, in measuring a given layer of material, the two magnets may initially determine currents in the circuits of their respective coils, so that variations in the action of the gaging magnet, brought about by variations in thickness of material being gaged, will be observable by comparison with, or difference from, the action of the master magnet. The latter moreover is preferably adjustable and is set to equality with the gaging magnet, at whatever thickness of material is desired to be measured, so that the meter indication may be normal or zero when the thickness is correct but will deviate therefrom by reason of the slightest variations from the desired thickness. Under this plan the initial alternating current, which may be taken from a light socket, may be divided and passed through the coils of the respective magnets, giving resulting values of current which can be so directed as to neutralize each other under normal conditions but create a differential upon any variation therefrom, which differential can be measured on the ammeter to indicate directly the departure from correct thickness in either direction. The arrangement may be considered as involving a gaging circuit controlled by the gaging magnet, and a master circuit controlled by the master or setting magnet, the two circuits, and the currents therein, being so arranged as to give the differential metering action described.

The diagram Fig. 9 indicates, at a point removed from the gaging magnet, a master armature 26 which may be a bar, block or disk of iron, opposed by a master magnet 27. The master magnet may be substantially similar to the gaging magnet, consisting of a laminated core having a body portion 28 with legs 29 at the two ends and a middle leg 30, and first and second magnet coils 31 and 32 in series but wound in opposite directions. Diagrammatically the magnet 27 is shown supported on a member 33 which has an adjustable relation to the armature 26, a right and left screw 34 being shown as a means of finely adjusting the space or gap 35 between the armature and magnet. For any desired thickness of material underneath the gaging magnet 17 it is only necessary to adjust initially the master magnet to give a neutral or zero reading, whereupon the slightest departures from the desired thickness will be reflected in the meter reading as will be further described.

The source of alternating current for the gaging and setting magnets is represented as positive and negative line wires 40 and 41. A suitable mode of interconnecting these with the magnet coils in a manner to give the differential metering action described is as follows. From the line wire 40 the current passes through conductors 42 and 43 to a primary induction or transformer coil 44 and thence by conductor 45 to the coils 21 and 22 of the gaging magnet, these being connected in series, and the circuit being completed by conductor 46 extending to the negative line wire 41 from the coil 22. Similarly the connections to the master magnet may include the conductor 42 and a conductor 47 leading to a transformer coil 48 from which extends conductor 49 to the coils 31 and 32 of the master magnet, the latter being connected by conductors 50 and 46 with the negative line wire 41.

The transformer 51 which includes the coils 44 and 48 is shown as a double transformer having a laminated core of the shape of the numeral 8 with opposite end legs 52 and 53 carrying the primary coils 44 and 48 a center leg 54 carrying a secondary coil 55 which receives the resulting or induced differential current.

It will be observed that the transformer primary coils 44 and 48 are oppositely wound so that they tend to neutralize each other and will develop zero current in the secondary coil 55 when the layer being gaged is of the correct thickness and the reactances and resulting currents balance. When excess thickness of layer causes increase of current in the gaging circuit this causes induced flow in the transformer secondary in one direction, whereas too thin a layer causes a reverse flow. A particular advantage in the double acting or differential transformer is that the action is independent of fluctuations occurring in the line wires, since any general fluctuations operate equally at both sides of the transformer and are neutralized. The current generated in the secondary coil therefore is dependent solely upon relative or differential variations in the gaging and master circuits, and therefore solely on variations in the thickness of the material. The transformer has the additional advantage that the secondary coil may consist of a smaller number of turns than the primaries and of heavier wire, so that the current differential between the two primary coils is received and magnified in the secondary coil, thus rendering the ammeter reading more sensitive.

Coming next to the ammeter, there are shown conductors or wires 59 extending from the secondary 55 of the transformer to the field coil 60 of an ammeter 61 conventionally shown in Fig. 1. An armature coil 62 may be the movable element and connected to swing an index or finger 63 over the graduations of a scale or dial 64 in opposition to the usual coil spring or springs set to bring the index to zero. By this connection the transformer secondary currents are converted into visual readings. The ammeter coil 62 may advantageously be excited as follows. A transformer 66 is shown as having its primary coil 67 connected by wires 68 with the line wires 40 and 41. The transformer secondary coil 69 is in circuit with the ammeter coil 62, a conductor 70 connecting them directly, the circuit being completed by a conductor 71 from the secondary to a reactance or coil 72, which may be variable, this in turn being connected by wire 73 to a variable resistance 74 and thence by a wire 75 to the meter coil 62. There may also be a milliammeter 77 in this circuit, for example in conductor 70, assisting in adjusting the current traversing coil 62. The meter is thus normally and constantly energized to take part in the metering action, and its excitation will be continuous and steady unless indeed the current in the mains should vary. The transformer 66 and reactance 72 are to be of such character as to determine the desired action of the armature coil 62, the reactance serving the further purpose of adjusting the coil 62 of the ammeter substantially into phase with the induced currents flowing in the fixed or field coil 60.

The direction and value of the current flowing through the field coil will determine the reading of the ammeter, and such reading therefore is indicative of the current flowing at any time through the gaging magnet coils, which in turn depends upon the value of the reactance therein and therefore the thickness of the layer of material being gaged. When the thickness is correct the reactance will be such as to balance that in the master magnet so that the current flow in the field magnet is zero and the ammeter will read zero. When the material is thicker than the predetermined thickness the reactance in the gaging circuit will be low so that greater current will flow through the primary 44 of the transformer, which thereby preponderates over the other primary 48, and induces in the secondary 55 a current in such direction as to excite the field 60 to cause the ammeter index to shift to the right against the yielding spring. When the material is too thin the opposite actions occur and the index moves to the left. For convenience the metering elements and windings can be so selected and arranged that a variation of one milliampere in the field circuit being measured will correspond with a difference of .001 inch in the thickness of material, so that when the material is too thick or thin the displacement of the index shows the error in thousandths of an inch. This may involve a multiplication at the transformer of the current difference by the factor 20 by suitable windings.

Suppose for example it is desired to produce sheet material of a thickness .100 inch. Placing a sample of correct thickness between the gaging magnet and its armature, the master magnet may then be adjusted correspondingly so as to bring the ammeter reading to zero. If subsequently variations of thickness should come beneath the gaging magnet this will cause an increase or decrease of separation, and the index pointer will move to the right or left in the amount of one space or graduation for each thousandths of an inch error in thickness. Not only therefore is the existence of error indicated, but the extent of error is shown, with substantial accuracy. Moreover the degree of error will be shown with substantial accuracy whether the apparatus is operating upon relatively thin or relatively thick material. Each division of the scale can be subdivided by judgment, so giving a gaging accuracy of .0001 inch. In gaging rubberized fabric the gaging tolerance may be only .003, so that the index would seldom pass more than a few divisions from zero in either direction.

Having thus explained the principles there will be described an illustrative embodiment in connection with Figs. 1–8. Figs. 1 and 2 show a calender 80, representative of the type of calender used in the production of rubberized fabric, although the invention of course could be used on other calendering apparatus. The calender 80 is shown as comprising the heavy cast side frames 81 supporting a series of rolls, for example a top roll 82, middle roll 83 and bottom roll 84 arranged in any convenient or well known manner. As indicated in connection with the bottom roll this may be a hollow shell having a cylindrical portion or drum 16 constituting the armature for the gaging magnet 17 and corresponding with the same parts in Fig. 9. The roll rotates on a shaft 85 and brings the successive parts of the drum or armature and overlying material progressively opposite to the magnet. The shaft bearings may have adjusting means 86 for setting the roll spacing and determining the gage of the material.

The calender side frames are shown formed with vertical ribs 87 on which the gaging or other parts may be mounted, and at the front of the left side frame is shown an instrument box or panel 88 supported on suitable brackets and having a forward extension 89 adapted to contain the rotary dial 64ᵃ of the ammeter, which may be read by means of a fixed index mark 63ᵃ, an arrangement the equivalent of the dial and index 64 and 63 of Fig. 9. On the instrument box is indicated a double pole switch 90 for throwing the apparatus into or out of circuit with the line wires 40, 41, which enter the apparatus by terminals 91. At the front is also shown a knob 92 for adjusting the variable resistance 74, also the ammeter 77, also a switch 94 for throwing the magnets into or out of circuit.

In Figs. 1 and 2 the raw or green rubber R is indicated as being fed between the rolls 82 and 83. It may be applied by hand, and it is rolled out and spread upon the surface of the roll 83 forming a layer of rubber R' of a thinness determined by the adjustment of the rolls. The fabric or stock F is shown entering between the rolls 83 and 84 from a supply, or another calender or other place. The rubber and the fabric are combined and the rubber is pressed intimately upon the fabric by the pressure between the rolls 83 and 84, resulting in a rubberized fabric RF which travels partly around and passes off from the roll 84 to another calender or a receiving point. The thickness of the combined materials RF will be determined by the adjustment of the rolls 83 and 84.

The present invention may be employed for gaging the materials at any desired point or points. For example, a gage may be applied upon the raw rubber layer R' on the roll 83 in order to indicate error and permit correction of thickness; and may be employed also to gage or indicate the thickness of the rubberized fabric RF, while traveling around the lowest roll 84. It is deemed sufficient to show one application of the invention, namely for gaging the thickness of the combined product, between the cylindrical portion 16 of the roll 84 and the magnet 17. It will be understood that the gaging operation at this point can be repeated at subsequent points, or in connection with each of a series of calenders; or the material may be passed over an idler pulley and gaged at that point, or may be drawn above a special iron block or plate for the same purpose.

The gaging magnet 17 hereof is conveniently applied near the underside of a rotating roll, this permitting the magnet to be mounted on a swinging lever 95 having a counterweight 96 at its further end and at a middle point provided with a pivot or ball bearing 97 permitting the lever to swing about an axle 98, these parts shown also in Figs. 7 and 8. The axle may be mounted in a sleeve 99 rigidly held by a block 100 bolted to the supporting ribs 87 in a manner to carry the gaging magnet at a suitable point inwards of the end of the roll. The axle 98 may in some cases be continued clear across the calender as indicated in dotted lines in Fig. 1, thus permitting the magnet to be shifted to any desired point in the width of the roll. This permits the material to be gaged at selected points. It also constitutes an effective indicator for the trueness of adjustment of the rolls, since the gage can be applied at various points across the width to test the uniformity of action at both ends and at the middle of the roll. When a roll is once adjusted however it usually runs accurately so that it is sufficient to apply a gage near one edge only of the traveling product, or at most two gages, one permanently located near each edge.

In Fig. 8 is shown a set screw 102 at one end of the carriage or support 23, and to be understood as duplicated at the other end, whereby the magnet 17 is clamped in place in the channels of the carriage. This permits the extent of clearness between the magnet and the rubberized fabric to be adjusted. Usually it will be sufficient to adjust the magnet as near as possible to the material without scraping contact, but sometimes, as in the case of extra thin material, it may be desirable to provide a greater clearness so as to afford a separation or gap between magnet and armature that will substantially equal the gap existing in the gaging of materials of usual thickness; thus tending to obviate any variation in the indicating action of the ammeter with materials of varying gage. In connection with the gaging magnet it will be understood that the surrounding metal parts including the carriage 23, wheels 25, lever 95 are to be constructed of nonmagnetic material, such as aluminum or alloys thereof, bronze or the like.

The master magnet 27 and armature 26, shown in diagram in Fig. 9, appear on a small scale in Fig. 1, and are shown on a larger scale in Figs. 3, 4, 5 and 6, where some of the parts assume a different physical form and embody actions and operations not illustrated in the diagram. Thus for instance instead of adjusting the magnet and armature relatively toward and from each other as in the diagram, the armature, in Figs. 3–6, is adjusted in a rotary manner, and gives the desired adjustment of magnetic flux and reactance by the progressively increasing cross section of armature brought opposite to the magnet. Furthermore the adjustment or position of the armature is indicated on a dial, the reading of which therefore corresponds with a given adjustment, and with a given thickness of material being produced. For example, for producing rubberized fabric of .100 inch thickness the master magnet will be set, and its dial will indicate a certain reading, and this reading can always be reproduced, without further test, whenever a product of the same thickness is desired.

In Figs. 3–6 the master armature 26ª is shown as a progressively tapered or wedge shaped piece of iron preferably curved within a circular contour, and arranged to be rotated to bring beneath the master magnet 27 the different portions of the armature, so that the magnetic flow and the reactance can be selectively varied without bodily adjustment toward and from the magnet but merely by the longitudinal or rotary movement. The magnet is E-shaped substantially as in Fig. 9, and comprises the core 28 having end legs 29 and a middle leg 30 extending toward the plane of the armature, with first and second magnet coils 31 and 32.

The entire magnet 27 may be supported and held in a fixed position in opposite supports 33ª, shown in the form of channels, with set screws 105 in the flanges thereof to lock the magnet in position. The supports or channels 33ª are formed in a frame 106 shaped generally to enclose and support the various elements including the adjusting screw 34ª by which the relation between the magnet and armature is determined. It will be understood that these various parts, other than the magnet and armature, are to be constructed of brass or other non-magnetic metal or material.

In connection with the use of an armature 26ª of a rotary wedge shape the mounting and operation may be for example as follows. The soft iron armature, exteriorly curved in circular form is filled in with non-magnetic metal, preferably brass, in the form of a core 108. This may be cast directly within the iron armature and may be formed with a central stud 109 extended downwardly, and at its upper side with a rotary cam 110. A cam follower 111 is shown in the form of a pin or roller resting on the inclined surface of the cam, with a rod 112 passing through a sleeve 113 and thence into the casing 114 of an indicator having a dial 115 over which moves an index or pointer 116 actuated by multiplying mechanism within the casing, so that for each position of the armature and cam the pointer indicates a position on the dial, which may be numbered arbitrarily or may be graduated in some cases to correspond directly with the thickness of material being gaged.

The armature 26ª with its core 108 are shown as having the form of a circular disk of substantial depth, with the upper surface closely below the plane of the lower faces of the magnet legs. The tapered armature disk is shown mounted for rotation within the circular recess 118 of a fixed supporting block 119 secured to the frame 106 through tongues 120 and screws 121. By this arrangement the armature is able to turn so as to bring varying cross sections of magnetic metal beneath the magnet, more especially beneath the middle leg thereof. The dimensions of the armature and its spacing from the magnet may readily be predetermined so that the reactance in the coils 31 and 32 will vary over a range corresponding substantially with the range of variation of reactance in the coils 21 and 22 of the gaging magnet.

The center stud 109 of the armature disk is shown extending downwardly through the block 119, where it is surrounded by a spring washer 123, below which is a gear or worm wheel 124 keyed to the stud and secured in place by a screw and washer device 125. The gear or worm wheel 124 may be turned by the adjusting screw 34ª, constituting a worm, having its shaft supported in bearing lugs 127 and extending forwardly to a hand piece at an accessible point.

The operation of this mechanism will be understood from the previous description. By turning the hand piece and screw the armature disk is rotated to selective positions, this permitting the master magnet to be adjusted as to its reactance to balance the gaging magnet for any desired thickness of material, the adjustment being indicated on the dial 115; and variations from the correct thickness of the material being gaged will thereupon appear as indications on the ammeter dial 64ª in units of .001 of an inch. The armature 26ª is shown in the figures as having a small cross section opposite to the gaging magnet. This is the equivalent of a substantial distance of separation of armature and magnet in the diagram Fig. 9, and thus corresponds with a fairly thick material being gaged. If working upon thinner material the adjusting screw 34ª would be turned by hand in a direction to rotate the armature counterclockwise in Fig. 3, thus bringing a thicker armature portion beneath the armature, corresponding with a closer separation in the diagram and representing the thinner material.

Referring to the ammeter dial and index in Figs. 1 and 2, the dial 64ª is of the rotary type bearing graduation marks and numerals which are read by means of the fixed adjacent index mark 63ª. Instead of providing a complete gaging equipment for each calender or gaging point, it may be sufficient to duplicate only the gaging magnet and its mounting elements, the remainder of the apparatus being placed upon a common panel for use with a plurality of gaging magnets at different places on a calender or upon different calenders. It is then only necessary to provide a multiple switch having a plurality of pairs of wires 45 and 46 extending to the respective gaging magnets. By this arrangement the switch can be thrown around from point to point and at each point the ammeter will indicate the gage of the material at the stage of production corresponding to the magnet thus connected with the panel apparatus. Or each gaging magnet may have its own master magnet, and each such magnet set be connected to be switched on to the current meter; although it is preferable to have a separate meter and dial for each gaging point.

The measuring operations with this invention are found to be very accurate for substantial departures to either side of the neutral or zero position. Equal divisions of the ammeter, indicating for example milliamperes, are found to represent equal variations in thickness of material, for example .001 inch per milliampere. The power factor of the magnet may be initially predetermined for the average conditions expected, by suitably varying the reactance and resistance in the circuit of the ammeter armature. The accuracy of the disclosed apparatus is far greater than the possible requirements of the industry of producing rubberized fabric.

The disclosed ammeter 61 may be in the nature of an electrodynamometer, and arranged for straight-line readings of thickness variations, so that equal differences give equal movements of the pointer 63; but this particular arrangement is not herein claimed, being the subject matter of application of Robert D. Hickok about to be filed, and having been found to give very satisfactory results in the operation of the present invention.

In one aspect the invention may be broadly described, without reference to the second or master magnet and the differential indicating function afforded thereby, as comprising in combination, a magnet, having a coil for energizing it, an armature opposed to the magnet, an alternating current circuit including the coil of the magnet, the magnet and armature being arranged or fitted to be movable relatively toward and from each other to afford a degree of opposed separation or spacing in accordance with the thickness of the material to be measured (whether the material be actually interposed between the magnet and armature or located elsewhere with a connection giving an equivalent effect), and means controlled by the inductive reactance in the magnet coil for indicating the degree of separation of the magnet and armature and thereby the thickness of the material; this last mentioned element referring to the current meter associated with the alternating current circuit, and which may otherwise be described as means for indicating the impeding effect in the circuit of the reactance existing at any time in the coil, and thereby indicating the thickness of the material which determines the spacing apart of the magnet and armature and thereby the amount of inductive reactance tending to impede the flow of current through the circuit and coil. In the aspect of a continuous or progressive indicating system operating upon an extended length of material the apparatus may be described as indicating or determining the fact or the extent of the deviation or variance from a predetermined correct thickness of the layer of material passed progressively through the apparatus, the degree of separation of the magnet and armature being controlled by the variations of thickness of the layer as it travels through the apparatus, these being indicated on the current meter or other indicating device. The preferred embodiment comprises the master magnet operating in conjunction with the gaging magnet to afford the valuable differential action described, and comprises the other described features of refinement and detail.

There has thus been described a thickness measuring instrument, apparatus or gage embodying the principles and attaining the objects of the present invention. Since various matters of operation, combination, arrangement, construction and detail may be modified without departing from the underlying principles it is not intended to limit the invention to such matters except so far as specified in the appended claims.

What is claimed is:

1. Apparatus for progressively gaging the thickness of a layer of sheet material, comprising a gaging magnet and a gaging armature mechanically held apart to a variable extent by the material, said magnet having end legs and an intermediate leg extended toward the armature, with a coil having turns near the ends of the magnet and the turns near one end wound oppositely to the other turns, whereby when the magnet and armature approach there will be high magnetic flux and reactance, and vice versa, an alternating current circuit connected with said magnet coil, and a current indicator operatively connected with said circuit to respond to variations of current in said circuit.

2. Apparatus for progressively gaging or indicating correctness or deviation of thickness of an object advanced through the apparatus, comprising a gaging magnet member having a magnet coil, and an opposed armature member, means supporting one of said members under yielding pressure toward the other member whereby the members are mechanically held apart to a degree determined by the thickness of the interposed object, an alternating current circuit including and energizing said magnet coil, and a current indicator operatively connected with said circuit, whereby deviations in the thickness of the object, causing variations of the inductive reactance in the coil, and therefore of the current in said energizing circuit, are indicated on said indicator; the gaging magnet having at least three alined poles to provide at least two opposite magnetic circuits, and its coil having turns at one point magnetically opposed to turns at another point, whereby when the magnet and armature are separated further apart such turns tend to neutralize and thus reduce reactance, and vice versa.

3. Apparatus for progressively gaging or indicating correctness or deviation of thickness of an object advanced through the apparatus, comprising a gaging electromagnet member, and an opposed gaging armature member, said members having parts located respectively for contact with the opposite sides of the object to be gaged, means supporting one of said members under yielding pressure toward the other member whereby the members are mechanically held apart to a degree determined by the thickness of the interposed object, an alternating current circuit including and energizing said magnet coil, and a current indicator operatively connected with said circuit, whereby deviations in the thickness of the object, causing variations of the inductive reactance in the coil, and therefore of the current in said energizing circuit, are indicated on said indicator; the gaging magnet having a substantially E shape with body and three poles to provide two opposite magnetic circuits, and its coil having its turns at one point magnetically opposed to its turns at another point to energize such opposite magnetic circuits, whereby when the magnet and armature are separated further apart such turns tend to neutralize and thus reduce reactance, and vice versa.

4. In a gage an alternating current electromagnet and its armature, adapted to be spaced apart with a gap variable according to the dimension to be gaged, the electromagnet having at least three poles to provide at least two magnetic circuits, and its coil having one group of turns magnetically opposed to another group of turns to energize oppositely the respective magnetic circuits, whereby with increase of gap and consequent decrease of reactance in the coil the groups of turns tend to neutralize and thus enhance the decrease of reactance, and vice versa.

PAUL B. SCHUSTER.